United States Patent [19]

Herring

[11] Patent Number: 5,247,553

[45] Date of Patent: Sep. 21, 1993

[54] SUBMERGED PASSIVELY-SAFE POWER PLANT

[75] Inventor: J. Stephen Herring, Idaho Falls, Id.

[73] Assignee: The United States of America as represented by the United States Department of Energy, Washington, D.C.

[21] Appl. No.: 799,251

[22] Filed: Nov. 27, 1991

[51] Int. Cl.$^5$ .............................................. G21C 9/00
[52] U.S. Cl. .................................... 376/912; 376/909; 376/284
[58] Field of Search ............... 376/912, 909, 273, 318, 376/284

[56] References Cited

U.S. PATENT DOCUMENTS

| 3,047,485 | 7/1962 | Ellis | 376/318 |
| 3,118,818 | 1/1964 | Bray | 376/318 |
| 3,844,885 | 10/1974 | Weems et al. | 376/284 |
| 4,088,535 | 5/1978 | Thompson et al. | 376/909 |
| 4,302,291 | 11/1981 | Severs et al. | 376/912 |

Primary Examiner—Donald P. Walsh
Assistant Examiner—Frederick H. Voss
Attorney, Agent, or Firm—Tyrone Davis; Thomas G. Anderson; William R. Moser

[57] ABSTRACT

The invention as presented consists of a submerged passively-safe power station including a pressurized water reactor capable of generating at least 600 MW of electricity, encased in a double hull vessel, and provides fresh water by using the spent thermal energy in a multi-stage flash desalination process.

14 Claims, 7 Drawing Sheets

MULTIPLE-(FOUR-) STAGE FLASH DISTILLATION

SUBMERGED PASSIVELY-SAFE POWER PLANT

CONTRACTUAL ORIGIN OF THE INVENTION

The United States Government has rights in this invention pursuant to Contract No. DE-AC07-76IDO1570 between the United States Department of Energy and EG&G Idaho, Inc.

BACKGROUND OF THE INVENTION

The invention relates to a portable submerged nuclear power plant. More particularly, a safe fully submerged water cooled nuclear reactor, submerged in at least 25 m of water. The reactor, encased in a hull constructed of steel or concrete with a capacity of at least 300 MW of generating capacity, and having the ability to incorporate a desalination plant to provide at least 5 m$^3$/s of fresh water.

During the mid-1970s an offshore power system, known as the Atlantic Generating Station (AGS) was proposed to mount two conventional 1100 MW Pressurized Water Reactors on two barges each about 350 ft×450 ft and to moor those barges within a protective barrier 2.8 miles off the New Jersey coast. The barrier, constructed of 18,000 pre-cast concrete dolosse (a tetrapod shape, weighing 20 tons each), was necessary to protect the plant from storms and from collisions with surface shipping. Construction of the barrier required about four years and $200 million (in 1975) and, furthermore, restricted the AGS to relatively shallow water. The plant would have been refueled and maintained on-station, as with a conventional, land-based power plant.

In 1971 the Electric Boat Division of General Dynamics proposed as an off-shore power station which would be permanently placed on the seabed in about 250 feet of water and about 5 miles from shore. The reactor was to be a conventional pressurized water reactor, producing about 1200 MWe. Although the Electric Boat design would have been initially constructed in a factory, refuelling and maintenance would take place on the seabed.

In contrast, the invention as described requires that no massive concrete barrier be poured or assembled, and the reactor is protected by the outer hull of the vessel, having no permanent structures and is easily transportable. The invention includes a pressurized water reactor, capable of generating at least 300 MW of electricity, encased in an submerged vessel having a collision barrier of frozen seawater. It further includes an additional desalination unit capable of providing at least 5 m$^3$/s of fresh water.

SUMMARY OF THE INVENTION

The submerged nuclear power plant was developed to provide a quick response to the worlds energy needs in developing countries. The invention as presented consists of a pressurized or boiling water reactor encased in a double hull vessel having positive buoyancy and tethered at least 10 m above the seabed. An anchorage system consisting of two lengths of cable and an intermediate weight of 10 to 1000 tonnes, which provides isolation from seismic movement of the seabed and allows for wave action during storms. The natural period for oscillation of the power plant about its equilibrium position is about 300 seconds, much longer than any components of seismic activity or wave action. The power plant includes a means for providing fresh water by using the waste heat from the condenser in a multiple stage flash distillation process. A missile and radiation shield within the reactor compartment is provided by heavily borated ice. A Brayton cycle refrigerator uses air as its operating fluid to subcool the air to −40° C. freezing the seawater and entrained air in insulated chambers outside of the hull. In the event of loss of heat sink or loss of refrigerating power, the borated ice would melt providing a thermal connection between the reactor and the hull.

Furthermore, during decommissioning the borated ice could be melted and activation products removed by ion exchange, thereby reducing the amount of radioactive waste produced.

The submerged power plant requires refueling every three to five years at a central refueling and maintenance station. In the event of civil war or other political instabilities in the host country, the reactor would be scrammed and maintained in a hot-standby configuration. The main turbine-generator would be operated only with its turning gear. One of the steam generators would continue operating, providing steam to an auxiliary turbine which would power the electric-motor-driven propellers. The decay heat of the 600 MWe reactor is sufficient to move the power plant about 500 km per day.

It is an object of this invention to provide a passively safe submerged nuclear power plant.

It is an object of this invention is to provide a easily transportable nuclear power plant that can be quickly brought on line and deactivated for transport.

Another object of this invention is to provide a system to secure the power plant to the seabed and yet allow up to 5 m of movement between the seabed and the plant during earthquakes and storms.

An additional object of this invention is to provide a cost effective water purification plant using the waste thermal energy of the nuclear power plant.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise a pressurized vessel having a means for collision protection; a reactor encased in the pressurized vessel having the ability to produce electric energy and release thermal energy; and a means for supplying fresh water attached to and in communication with the pressurized vessel and having the ability to utilize the thermal energy from the reactor for supplying fresh water.

BRIEF DESCRIPTION OF THE DRAWINGS

The accompanying drawings, which are incorporated in and form part of the specification, illustrate an embodiment of the of the present invention and together with the description, serve to explain the principles of the invention. In the drawings.

DETAILED DESCRIPTION OF THE INVENTION

Figure 1:
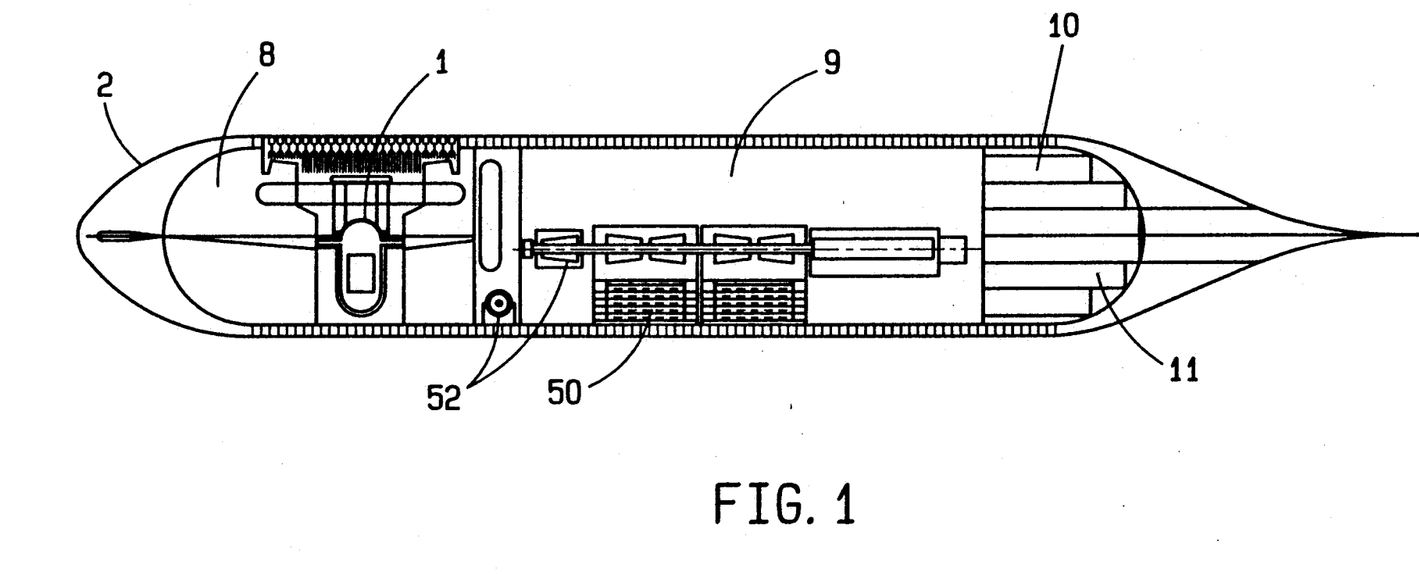
FIG. 1 shows an embodiment of the invention.
Figure 2:
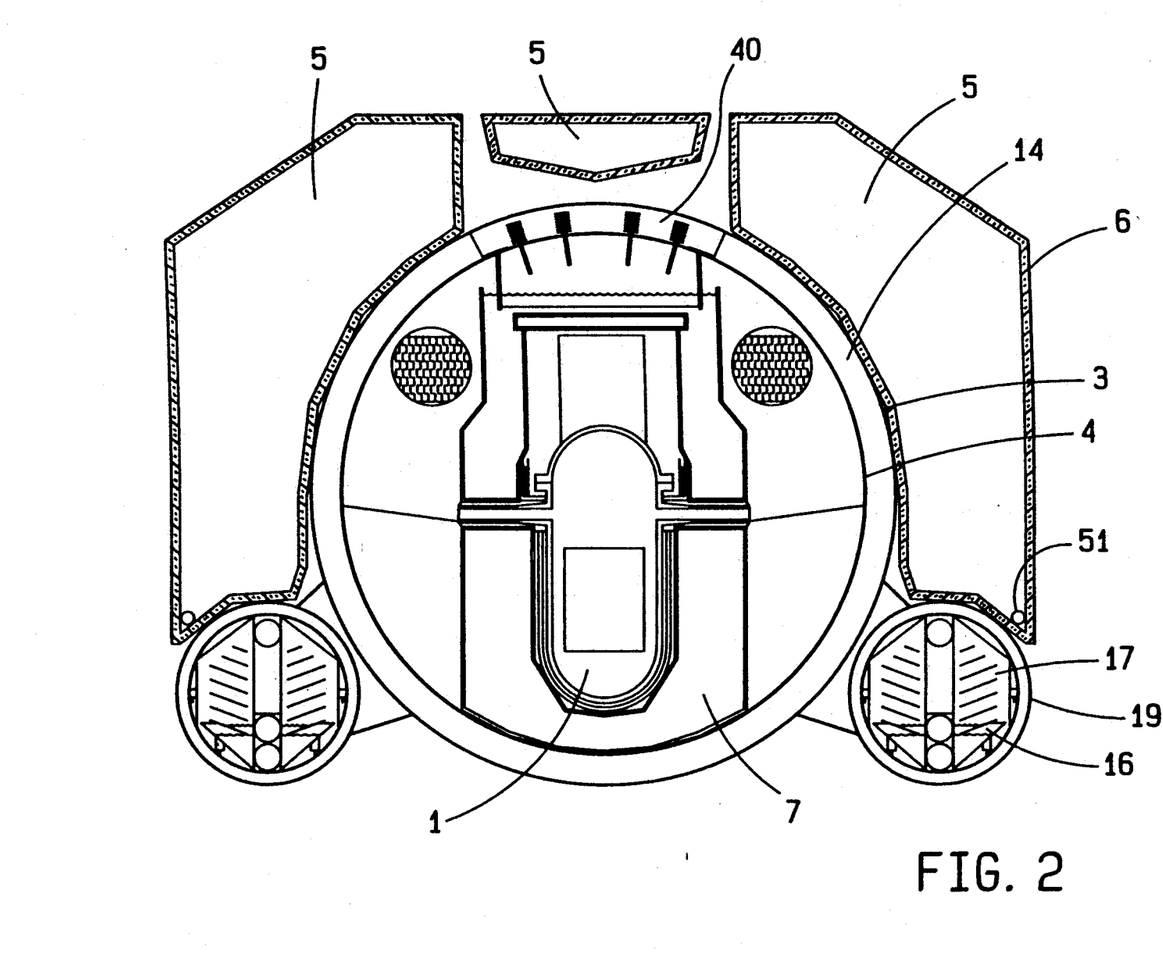
FIG. 2 shows a cutaway of the reactor compartment of FIG. 1.

Referring to FIGS. 1 and 2, a 600 MW pressurized water reactor, such as a modified AP600, modified Safe Integral Reactor (SIR) or a small BWR 1 is contained in a submarine hull 2 some 22.5 m in outside diameter. In emergency conditions, the reactor is cooled by natural convection of the ambient seawater. Seawater enters the space between the double hulls on the underside of the vessel and exits from that space at the top of the vessel. The submerged power plant 1 is protected from submarine collisions be a layer of frozen seawater 5 a minimum of 4.25 m thick on the top and sides of the plant. The frozen seawater 5 is contained in a hollow shell whose walls 6 consist of a steel-pressurized foam insulation-steel sandwich about 300 mm thick. The seawater 5 in the collision-protection chamber is initially liquid. A Brayton cycle refrigerator 51 using air as its working fluid is used to freeze the seawater 5. The air is cooled to $-40°$ C. and released at the bottom of the collision-protection chamber, subcooling the seawater. The subcooled seawater solidifies on the walls 6 of the collision-protection chamber. This refrigeration scheme makes the freezing of very thick sections of ice possible. The reactor 1 housed in the forward compartment 8 and the turbine generator 52 in the central section 9. The control room and crew living areas are in the aft compartment 10. A crew of 10-20 would man the plant for 7 or 14 days. The crew either comes from the shore of the host country or else from a surface vessel equipped with a diving capsule.

The hull consists of inner and outer cylinders 3, and 4 separated by webs 15 on one meter centers. In general, the stresses at the 200 m operating depth are less than 35 ksi, well within the capability of 1040 steel. The critical buckling pressure exceeds the operating hydrostatic pressure by a factor of 15. The cylindrical section of the hull 2 has a mass of 100.5 t/m and a total mass of 14,000 t. Since the displacement of the hull is 35,000 t, the allowable mass for the reactor 1, turbine-generator 52, coolant, control facilities 11 and other plant components is 21,000 t.

Figure 3:
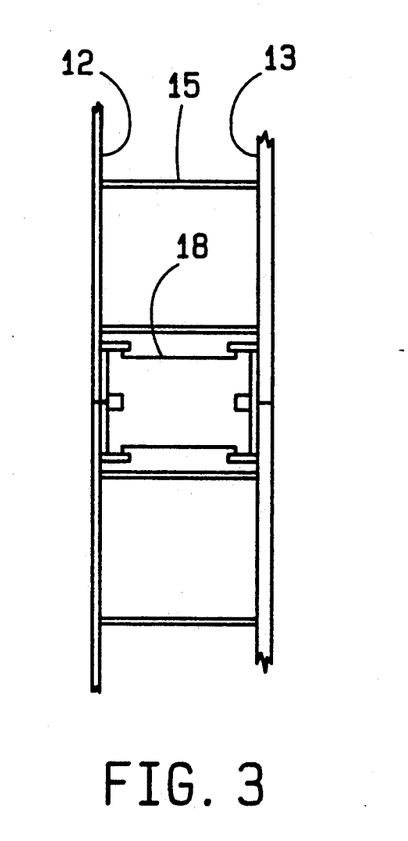
FIG. 3 is a detail of the inner and outer rings which combine to form the hull of the invention as shown in FIG. 1.

FIG. 3 shows the modular construction of the cylindrical section of the hull, which is composed of rings 12, and 13 each 2 m long and 22.5 m in outer diameter. The rings are identical except for the provisions for hatch openings. The 100 mm thick plate for the inner hull 13 is first rolled into a ring of 20 m diameter. The 40 mm thick webs 15 are then welded to the inner hull on one meter centers. Finally the 50 mm outer hull 13 is welded to the webs 15. The completed unit weighs about 200 t. The ring 12, and 13 could be positioned vertically or flat for the welding, depending on available space. Openings for the natural convection of seawater between the hulls at the top and bottom provide locations for inserting and removing the automatic welding machine 18. These openings and annular passages would also be used during maintenance by robotic machines which would remove biological encrustation.

Figure 4:
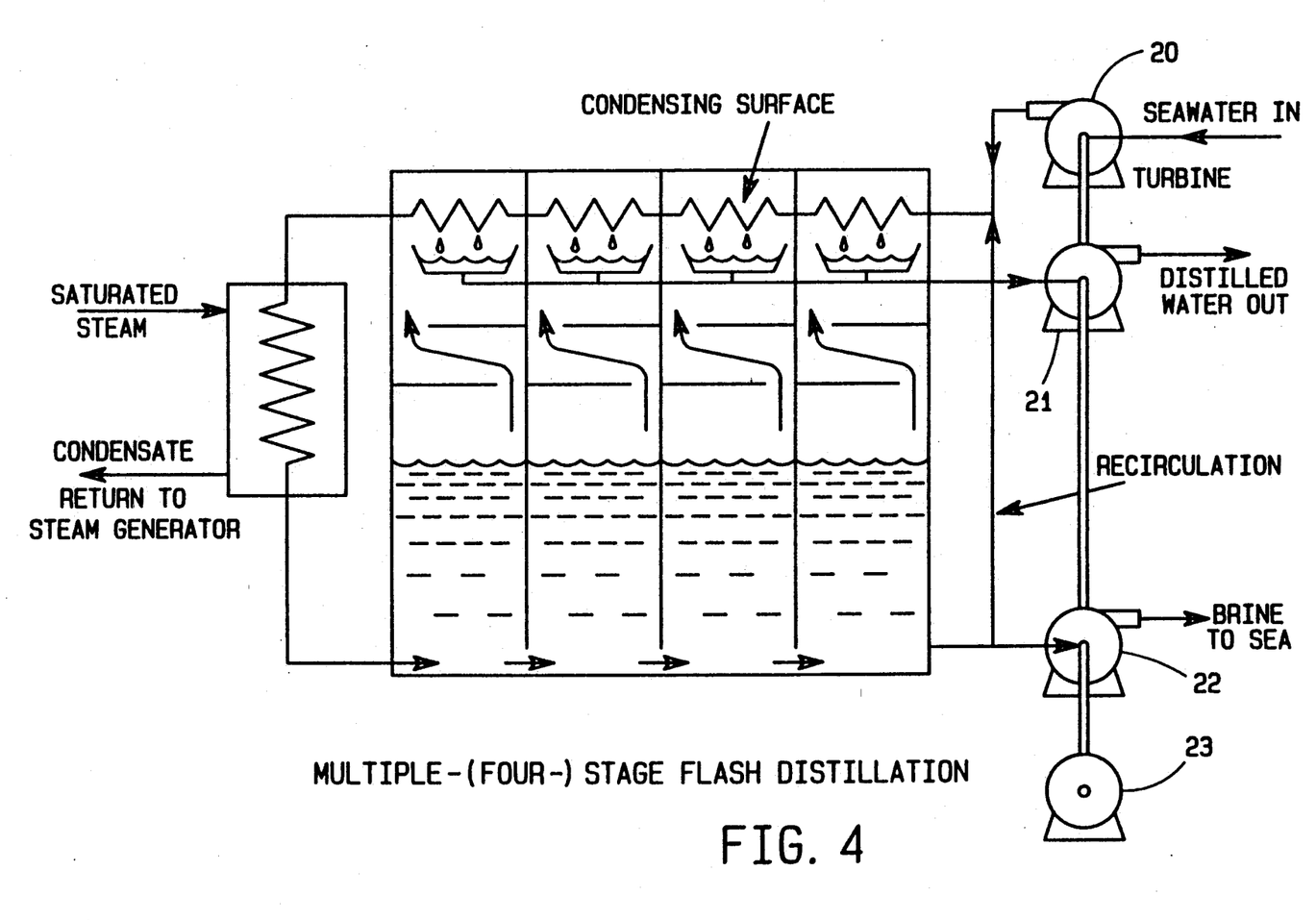
FIG. 4 is a flow diagram of the multiple stage flash distillation unit.

By using the 1200 MW rejected by the power plant 1 in a multistage flash (MSF) distillation unit 16, as shown in FIG. 4, the plant can supply about 5 m$^3$/s of fresh water to the host country. The MSF distillation process has an advantage that the flash chambers 17 contain no heated surfaces, so that the increased salt concentration remains in the brine and fewer scale deposits occur. Recent designs of MSF evaporators provide a large number of stages in one vessel by simple divisions within the vessel. These designs have provided as many as 19.3 kg of fresh water per kilogram of saturated steam. The production of fresh seawater in this design is based on 10 kg of fresh water per kilogram saturated steam. The MSF distillation unit 16 is contained in a separate hull 19 from the submerged power plant 1. Because the distillation process takes place near atmospheric pressure, the seawater inlet pump 20 is really a turbine, providing power to the distilled water product pump 21 and the brine return pump 22. The electric motor 23 compensates for hydraulic friction and mechanical inefficiencies in the system. The fresh water is pumped to the shore of the host through a flexible 2 m diameter pipeline 24 located in a seabed trench. Such a tube 24, having a wall thickness of 10 mm and a length of 30 km, is transported on a spool about 10 m in diameter and 15 m long. Close to shore and in areas of heavy shipping traffic, the flexible tube is connected to a rigid steel pipe.

Figure 5:
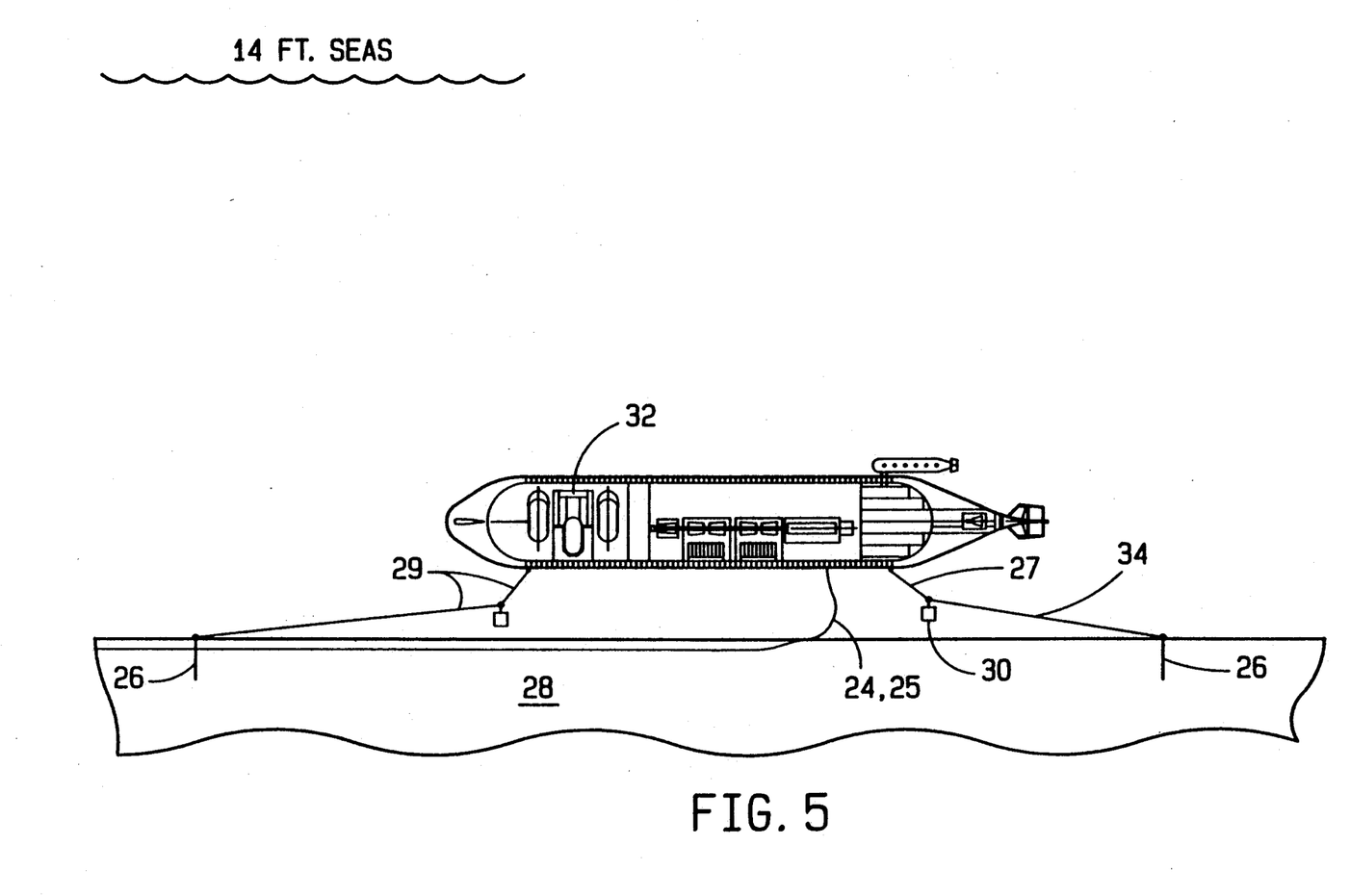
FIG. 5 is another embodiment of the invention in its anchored position.

The only permanent structures at the power plant location are the undersea electrical cables 25 and anchorages 26. The anchorages 26 are 10-15 m augers or piles driven into the seabed 28. The anchorage system consists of four sets, each with two cables 29 and an intermediate weight 30. The weight 30 can be 10 to 1000 tons, depending on water depth and the resonant frequencies desired. The anchorage point on the hull contains a drum on which several meters of line would be wound. In the event of a severe collision or a large displacement earthquake the drum would slip or the anchor line 29 would break. The power plant 32 maintains a positive buoyancy of approximately 100 t at all times, while being towed and while operating. The plant 32 is winched to and held by the anchor cables 29. This assures that should there be a failure the plant would float to the surface. The anchorage arrangement allows the submerged power plant 32 to move 5 m horizontally or vertically from its equilibrium position in response to seismic movement of the seabed, wave action due to storms and due to collisions with submarines. The selection of the upper and lower cables 27, and 34 lengths and the weight 30 determines the amount of restoring force when the power plant 32 is displaced from its equilibrium position. The weights 30 are concrete with an internal chamber that can be partially filled with air or seawater. By adjusting the submerged buoyancy of the weights 30 by injecting compressed air, the resonant frequency of the anchorage system can be remotely adjusted to meet wave action and seismic conditions. Because the anchorage system requires that the vessel have a positive buoyancy, the power plant 32 can withstand the in-leakage of a large amount of seawater before settling to the seabed.

The submerged power plant always maintains a positive buoyancy. Additional buoyancy can be added for trim and surface movement by injecting compressed air into some of the annular volumes 14 between the inner and outer hulls 3, and 4. The positive buoyancy with all of the annular volumes 14 flooded is 980 Kn. The effective length of the lines between the hull and the anchorages 26 is 20 m. Since the mass of the plant is about 47,000 tonnes (92,000 tonnes with the frozen seawater 5 for collision protection), the period of oscillation for the plant moving horizontally or vertically in the anchorage system is about 5 minutes, far longer than any seismic oscillations of the seabed 28. Thus, during an earthquake, the plant remains essentially fixed while the seabed moves horizontally and vertically beneath it.

Figure 6:
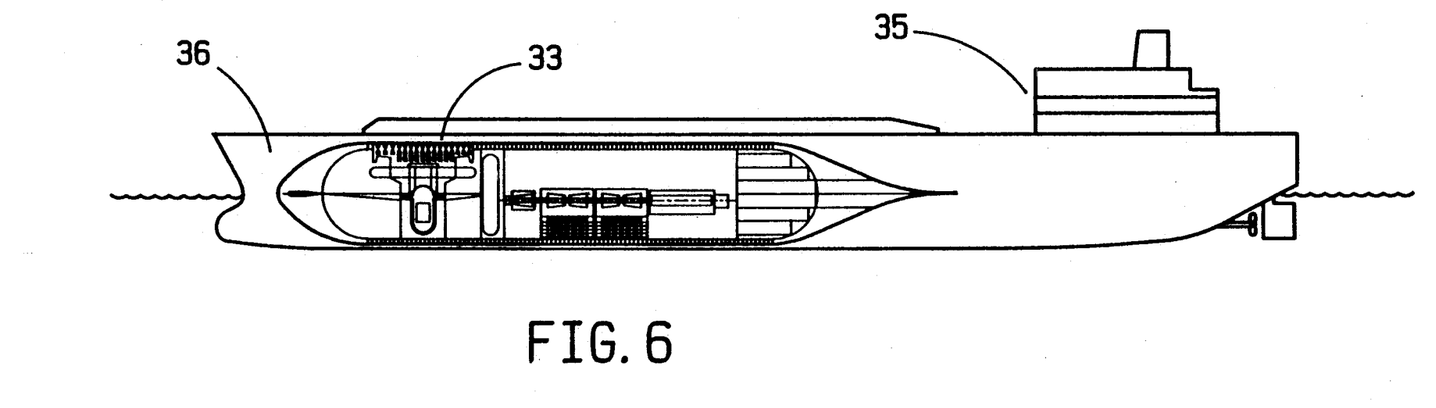
FIG. 6 is a side view of an embodiment of the invention in its transport vessel.
Figure 7:
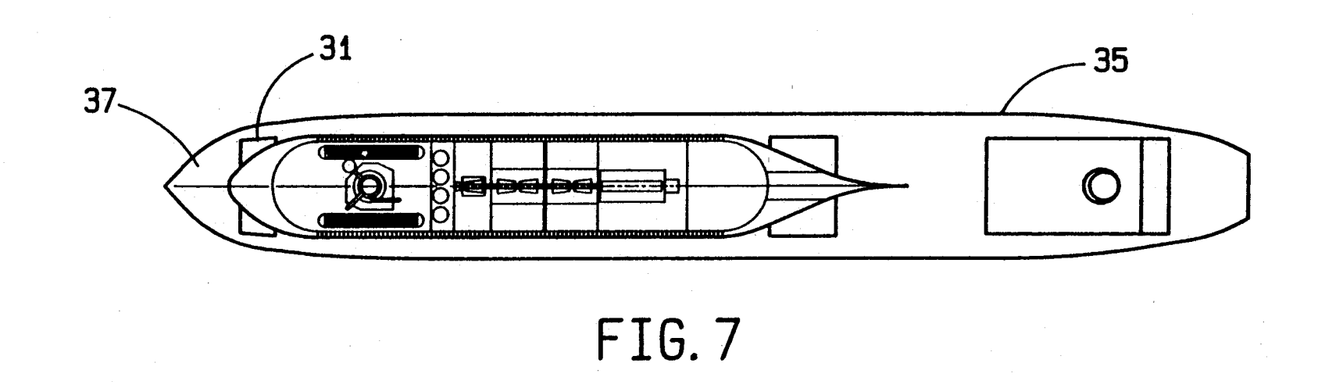
FIG. 7 is a top view of the invention as shown in FIG. 6.

As shown in FIGS. 6 and 7, the plant can be towed to the refuelling and maintenance station by sea-going tug or aboard a specially constructed transport ship 35. While being towed, the submerged power plant would have a positive buoyancy but would remain below the action of waves because of hydrofoils 31 exerting an downward force of the vessel. In this way the vessel would immediately surface should the towing tug loose power. The transport ship 35, would be used when moving the submerged power plant 33 through the Suez or Panama canals or into the Great Lakes. The transport ship 35 has a large forward bay 36 which can be flooded and a bow 37 that could open to accept a power plant 33 floating near or at the surface. Minor repair could be done aboard the transport ship 35. In addition, the transport ship 35 could be used in an emergency as a sealed container in which to carry a damaged power plant back the repair facility.

Figure 8:
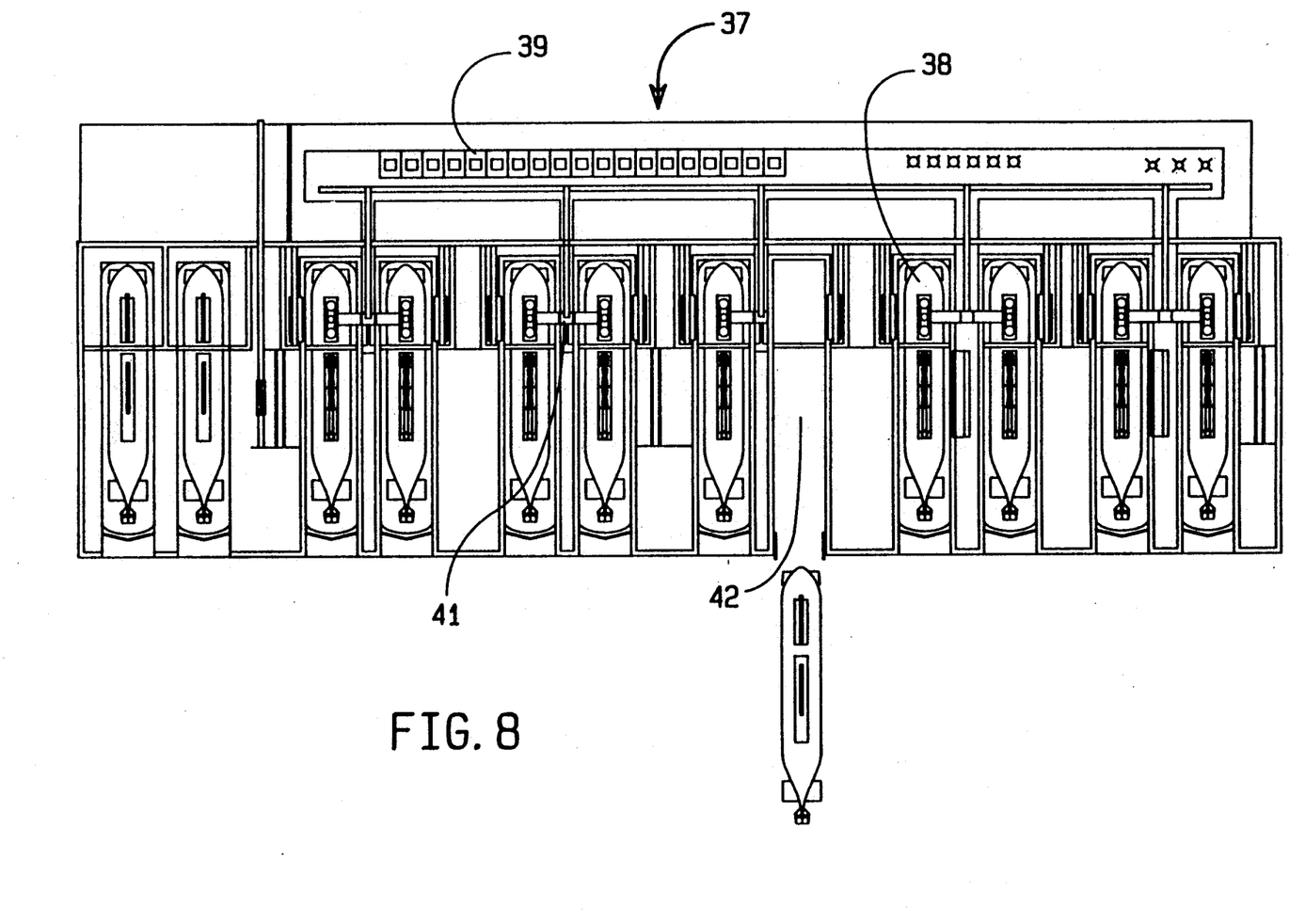
FIG. 8 shows embodiments of the invention in its refueling and maintenance station.

The Large Refuelling and Maintenance Station 37 is shown in FIG. 8. The forward section of each bay is a hot-cell 38 and is adjacent to a spent fuel pool 39. The hatch over the reactor has been removed, the head is removed from the reactor pressure vessel and the fuel is removed vertically by a refuelling machine 41. If necessary, the steam generators can be removed vertically through the same hatch. Simultaneously, maintenance on the turbine-generator can be done and, if necessary, the turbine or generator can be removed vertically through the longer turbine-generator hatch. The turbine-generator maintenance shop 42 is located in the center part of the refuelling and maintenance station. The condenser 50 is composed of four modules, each containing a feedwater pump and a seawater pump and two banks of condensing tubes. The condenser modules can be removed by rotation along the walls of the turbine-generator chamber and a vertical lift through the open hatch.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A portable submerged nuclear power plant comprising:
    a vessel, said vessel including a hull having inner and outer cylinders separated by a plurality of webs, said hull configured in such a way as to allow water free movement between said inner and outer cylinders, a reactor compartment, a generator compartment, and a crew compartment;
    means for collision protection having a hollow steel-pressurized foam compartment surrounding said hull, and wherein said means for collision protection includes a brayton cycle refrigerator within said hollow steel-pressurized foam compartment using air as a working fluid and whereby said water is subcooled forming a layer of borated ice at least 4.25 m thick within said hollow steel-pressurized foam compartment surrounding said reactor;
    a reactor encased in said reactor compartment having the ability to produce electric energy and release thermal energy; and
    means for supplying fresh water attached to and in communication with said vessel and having the ability to utilize said thermal energy from said reactor for supplying said fresh water.

2. The submerged nuclear power plant, as recited in claim 1, wherein said means for supplying fresh water comprises;
    a multistage flash distillation unit.

3. The submerged nuclear power plant, as recited in claim 2, comprising;
    means for anchorage to a seabed, which allows a positive buoyancy of at least 100 t.

4. The submerged nuclear power plant, as recited in claim 3, wherein said means for anchorage comprises;
    anchor lines attached to said hull of said vessel and said seabed, and having weights placed at a midpoint of said anchor lines whereby the submerged nuclear power plant is isolated from vertical and horizontal seismic movements of the seabed.

5. The submerged nuclear power plant, as recited in claim 4, wherein said inner and outer cylinders form a cavity, said cavity contains a compressed gas to achieve a greater positive buoyancy for said vessel.

6. The submerged nuclear power plant, as recited in claim 4, wherein said reactor is cooled by convection as water passes through said inner and outer cylinders.

7. The submerged nuclear power plant, as recited in claim 6, wherein said means for anchorage includes having at least one anchorage point on said hull containing a drum having said anchor line wound around the circumference allowing said anchor lines to slip in the event of an earthquake minimizing the damage to said hull.

8. A passively safe nuclear power plant comprising:
    a vessel, said vessel including a hull having inner and outer cylinders separated by a plurality of webs, said hull having means for reactor cooling whereby said inner and outer cylinders are configured in such a way as to allow water free movement between said inner and outer cylinders, a reactor compartment, a generator compartment, and a crew compartment;
    means for collision protection having a hollow steel-pressurized foam compartment surrounding said hull, and wherein said means for collision protection includes a brayton cycle refrigerator within said hollow steel-pressurized foam compartment using air as a working fluid and whereby said water is subcooled forming a layer of borated ice at least 4.25 m thick within said hollow steel-pressurized foam compartment surrounding said reactor;

a reactor encased in said reactor compartment having the ability to produce electric energy and release thermal energy; and means for supplying fresh water attached to and in communication with said vessel and having the ability to utilize said thermal energy from said reactor for supplying said fresh water.

9. The passively-safe submerged nuclear power station, as recited in claim 8, comprising;

means for anchorage to a seabed which allows a positive buoyancy of at least 100 t.

10. The passively-safe submerged nuclear power station, as recited in claim 9, wherein said means for anchorage comprises;

anchor lines attached to said hull having snubbers secured to said anchor lines and said snubbers including weights placed at a midpoint of said anchor lines to limit the vertical movement of said vessel.

11. The passively-safe submerged nuclear power station, as recited in claim 10, wherein said anchorage system includes having at least one anchorage point on said hull contain a drum having said anchor line wound around the circumference allowing said anchor lines to slip in the event of an earthquake minimizing the damage to said hull.

12. The passively-safe submerged nuclear power station, as recited in claim 11, wherein said vessel further comprises;

a hull, said hull includes inner and outer cylinders separated by a web.

13. The passively-safe submerged nuclear power station, as recited in claim 13, wherein said reactor is cooled by convection as water passes through said inner and outer cylinders.

14. The passively-safe submerged nuclear power station, as recited in claim 12, wherein said inner and outer cylinders form a cavity, said cavity contains a compressed gas to achieve a greater positive buoyancy for said vessel.

* * * * *